US009495669B2

United States Patent
Pradeep et al.

(10) Patent No.: US 9,495,669 B2
(45) Date of Patent: Nov. 15, 2016

(54) TEXT-AUGMENTED INTERACTIVE SELF-SERVICE TERMINAL SESSIONS

(71) Applicant: NCR Corporation, Duluth, GA (US)

(72) Inventors: Mandapati Venkata Pradeep, Hyderabad (IN); Marreddy Thumma, Hyderabad (IN); Phani Kumar Jonnalagadda, Hyderabad (IN); Andrew W D Smith, Dundee (GB)

(73) Assignee: NCR Corporation, Duluth, GA (US)

( * ) Notice: Subject to any disclaimer, the term of this patent is extended or adjusted under 35 U.S.C. 154(b) by 74 days.

(21) Appl. No.: 14/315,923

(22) Filed: Jun. 26, 2014

(65) Prior Publication Data

US 2015/0287407 A1    Oct. 8, 2015

(30) Foreign Application Priority Data

Apr. 7, 2014    (IN) .............................. 1843/CHE/204

(51) Int. Cl.
*G06Q 20/18*    (2012.01)
*G06F 17/28*    (2006.01)
*G07F 19/00*    (2006.01)

(52) U.S. Cl.
CPC ............. *G06Q 20/18* (2013.01); *G06F 17/289* (2013.01); *G07F 19/20* (2013.01); *G07F 19/201* (2013.01); *G07F 19/207* (2013.01)

(58) Field of Classification Search
CPC ................................. G10L 15/26; G06F 17/28
USPC ........................................................ 704/1–10
See application file for complete search history.

(56) References Cited

U.S. PATENT DOCUMENTS

| 2012/0069131 A1* | 3/2012 | Abelow | G06Q 10/067 |
| | | | 348/14.01 |
| 2012/0236201 A1* | 9/2012 | Larsen | H04N 21/235 |
| | | | 348/468 |

* cited by examiner

*Primary Examiner* — Marcellus Augustin
(74) *Attorney, Agent, or Firm* — Schwegman, Lundberg & Woessner (57) ABSTRACT

Various embodiments include text-augmented interactive self-service terminal sessions as may be implemented in whole or in part according to one or more of the systems, methods and software illustrated and described herein. One method embodiment includes an SST and a remote service representative terminal device. The remote service representative terminal device captures live audio and video to form a multimedia stream and performs speech-to-text processing against the audio to obtain text. The text is then added to the multimedia stream. In some embodiments, the multimedia stream is then provided over a network to the SST. The SST may then provide a view of audio and video of the multimedia stream along with a view of the text. The text in such embodiments is presented synchronously with the audio and video.

20 Claims, 7 Drawing Sheets

TEXT-AUGMENTED INTERACTIVE SELF-SERVICE TERMINAL SESSIONS

BACKGROUND INFORMATION

Increasingly consumers are conducting financial transactions through Self-Service Terminals (SSTs) without the assistance of a teller or clerk. In fact, in many cases these transactions are conducted without any individual, other than a consumer, in the vicinity of the SSTs; other than, perhaps, a security camera integrated into the SSTs or in proximity to the SSTs. However, there are times when a consumer may prefer or feel a need to speak directly to a teller or clerk. Additionally, entities providing service via SSTs may desire to provide consumers an option for human interaction.

Interactive SSTs, such as the NCR Interactive Teller available from NCR Corporation of Duluth, Ga., provide multimedia, human-interactive session capabilities for such purposes. Through such interactive SSTs, consumers are able to communicate with service representatives via video and audio exchanged between an SST and a service representative computing device. However, the service representative may be located virtually anywhere and may speak with an accent, may speak very quickly, or may speak a language not understood by the SST consumer. Additionally, an environment within which the SST is located may be noisy, making it difficult for the SST consumer to hear audio coming from a speaker or telephone-like handset of the SST. Further, the SST consumer may be hard of hearing. These and similar audio-related issues confound full utility realization of such interactive SSTs by all consumers.

SUMMARY

Various embodiments include text-augmented interactive self-service terminal sessions as may be implemented in whole or in part according to one or more of the systems, methods and software illustrated and described herein.

One method embodiment that may be performed at one or more locations within a computing environment including at least one SST includes a remote service representative terminal device. The remote service representative terminal device may perform a method including capturing live audio and video and performing speech-to-text processing with regard to the captured audio to obtain text. The audio and video may be received already joined in a single multimedia stream or a multimedia stream may be formed therefrom. In either case, the text is then added to the multimedia stream. In some embodiments, the multimedia stream is then provided over a network to an SST. The receiving SST may then provide a view of audio and video of the multimedia stream along with a view of the text. The text in such embodiments is presented synchronously with the audio and video.

DETAILED DESCRIPTION

Various embodiments include at least one of systems, methods, and software that can be implemented with regard to interactive Self-Service Terminals (SSTs). Some such embodiments provide text representations of a least a portion of oral communication between an SST consumer and a remote service representative. Interactive SSTs generally provide an ability for an SST consumer to initiate and conduct an audio and video enabled communication session with a remote service representative.

For example, in some embodiments, the SST may be an Automated Teller Machine (ATM), an SST consumer may be a banking customer, and a remote service representative may be a bank teller located in a location remote to the ATM. The SST consumer may input a bank card and a Personal Identification Number (PIN) number to authenticate in relation to one or more accounts. The SST consumer may then manipulate various control elements of the SST to request an interactive session with a remote service representative. An interactive session including video and audio is then initiated. A camera and a microphone present on the SST as well as a camera and microphone present on a remote service representative computing device are activated. Audio and video between the SST and the computing device of the remote service representative are then exchanged in a live multimedia session.

During the live multimedia session, the SST consumer may have difficulty understanding or hearing speech of the remote service representative for a variety reasons. Such reasons may be due to a different language or accent of the remote service representative, noise present within an environment of the SST, hearing deficiencies of the SST consumer, or any other or combination of reasons. Regardless of the reason, various embodiments herein provide a textual view on the SST that is synchronized with audio of the live multimedia session.

For example, the textual view may be generated from text added to a live multimedia data stream received from the remote service representative computing device. The text may be added to the live multimedia data stream on the remote service representative computing device, by a host that operates on a network between the remote service representative computing device and the SST, or locally on the SST.

Regardless of where the text data is added, the text is obtained in some embodiments by submitting at least the audio of the live multimedia data stream to a speech-to-text module. An example of a speech-to-text module is a speech-to-text Application Programming Interface (API) available from Nuance Communications, Inc. of Burlington, Mass., that outputs text. The text is then added to the live multimedia data stream.

Some embodiments may further include abilities to translate the text added to the live multimedia data stream from one language or local form of a language to another language or local form of the language. For example, the text may be translated from English to Spanish or from a British English form to a United States English form. In some such embodiments, the text may be translated prior to additional to the live multimedia data stream on the same or a collocated computing device that performs the speech-to-text processing. In other embodiments, the translation may occur on a computing device that is presenting the text, such as the SST or the remote service representative computing device.

Although such embodiments are described in the context of presenting text of a live multimedia data stream to an SST consumer, the same or similar processes may be performed to present text on the remote service representative computing device.

These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
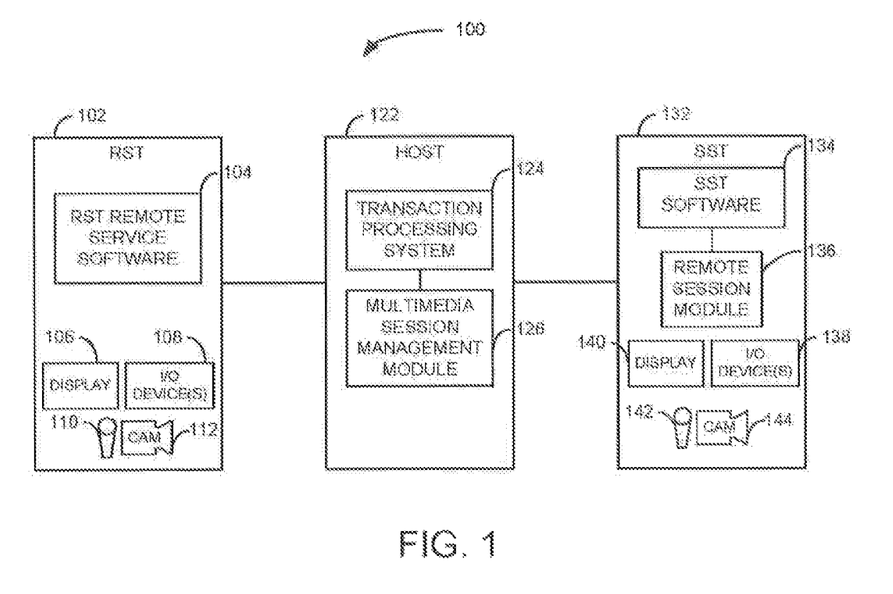
FIG. 1 is a logical block diagram of a system architecture, according to an example embodiment.

FIG. 1 is a logical block diagram of a system 100 architecture, according to an example embodiment. The system 100 is an example system on which various embodiments may be implemented. The system 100, in some embodiments, includes a Remote Service Terminal (RST) 102, a host 122, and an SST 132.

The RST 102 is a computing device utilized by a remote service clerk. The remote service clerk, via the RST, may provide teller, checkout clerk or cashier, customer service, and other such types of service to SST 132 consumers.

The SST 132, in some embodiments, is an ATM. In other embodiments, the SST 132 is a self-service point of sale terminal. In further embodiments, the SST 132 may be a kiosk, such as in a shopping mall, amusement park, auto dealer, hotel, airport, airline hub, or other location where consumers may desire to gain electronic access to data and in some instances, interact with remote service personnel via the SST 132.

The host 122, in some embodiments, is a transaction processing host that processes transaction initiated or otherwise performed with the SST 132. In some embodiments, the host is a banking system that processes one or more of banking transactions, debit or credit card transactions, and other financial services transactions. The host 122 is typically connected to the RST 102 and SST 132 via a network to enable exchange of data there between. In some embodiments, the network that interconnects the host 122, RST 102, and SST 132 is a single network established and maintained in accord with one or more of statutory, regulatory, industry standard, network operator, and other policies and requirements, such as may apply to banking-type transactions. In some additionally embodiments, some data may be carried over such a network, such as specific financial transaction data, while other data may be carried over a second network, such as live multimedia session data that may be carried over the Internet. Thus, data interconnections between the host 122, RST 102, and SST 132 may be made via a single network, two networks, or more networks, depending on the particular embodiment.

Within the system 100, only one of each of the RST 102, host 122, and SST 132 are illustrated. However, other embodiments may include a plurality of each of one or more of the RST 102, host 122, and SST 132. Further, although the host 122 may be a single computing device in some embodiments, the host 122 in other embodiments may be implemented on a server cluster, on a plurality of servers or server clusters that are geographically distributed.

The RST 102, in some embodiments, is a computing device that includes remote service software 104, a display device 106, Input/Output (I/O) devices, a microphone 110, and a camera 112. The remote service software 104 is software through which a remote service person remotely interacts with the SST 132 and conducts live multimedia sessions with SST 132 consumers, which can generally be thought of as video calls.

Figure 4:
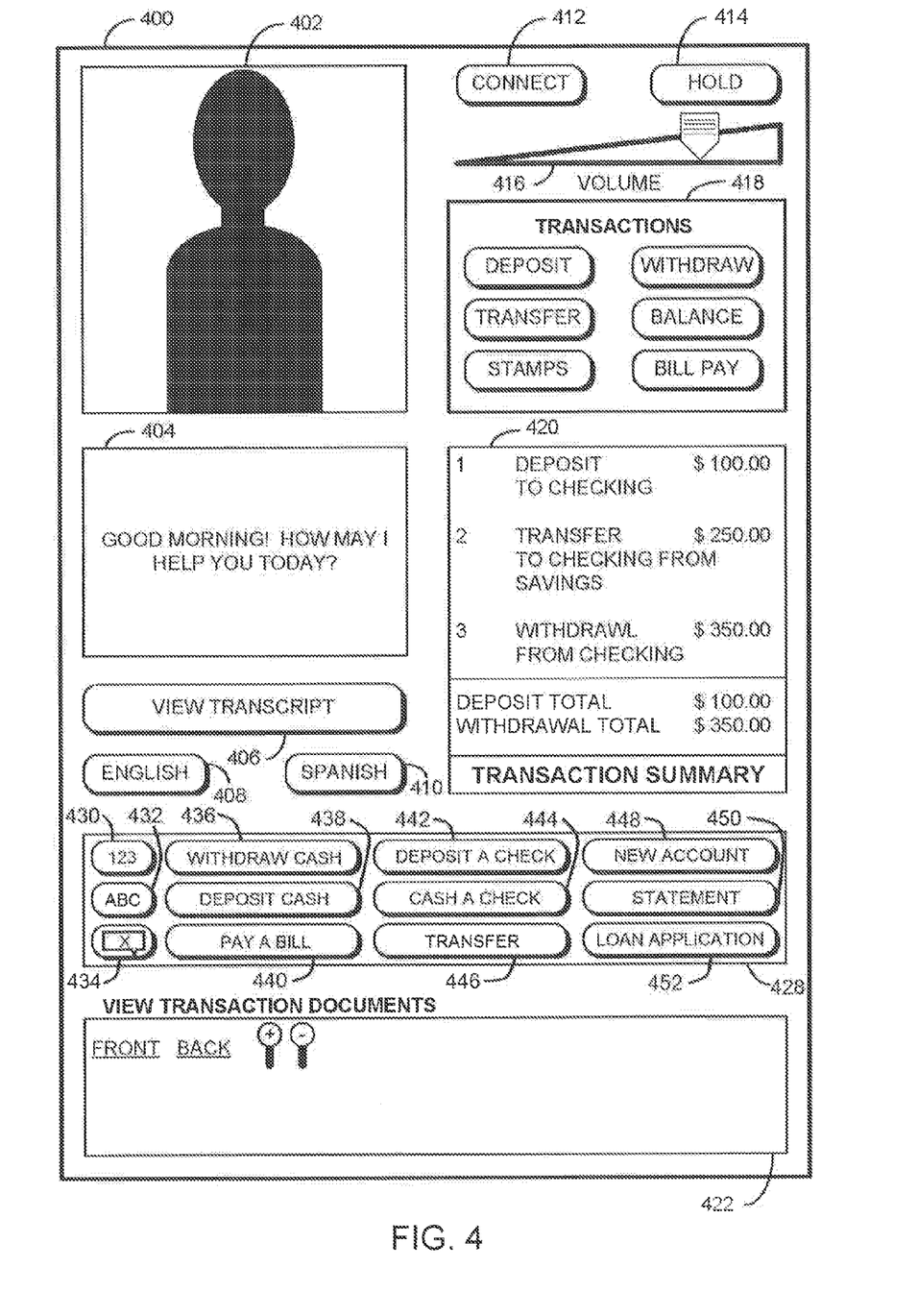
FIG. 4 is a user interface illustration, according to an example embodiment.

For example, the remote service software 104 includes software that enables connection to and interaction with the SST, such as to receive and present data representative of user input (i.e., tendered currency and checks) and to issue commands (i.e., a currency dispense command). Additionally, the remote service software 104 includes functionality to facilitate live multimedia interactivity with SST 132 consumers. In particular, the remote service software 104 is able to receive video from the camera 112 and audio from the microphone 110 to combine into a multimedia data stream. The multimedia data stream may include multiple channels, such as video, audio, and one or more data channels, some channels of which may be time synchronized. For example, the multimedia data stream may be a data stream that may be played by an application plug-in, such as the FLASH® player available from ADOBE® Systems Incorporated of San Jose, Calif. The remote service software 104 also typically includes functionality to receive a multimedia data stream from the SST 132 and present a view thereof within a user interface of the remote service software 104. An example of such a user interface is illustrated in FIG. 4. Accordingly, the remote service software 104 may also include an application plug-in or native functionality allowing the remote service software 104 to present a view of a multimedia data stream received from the SST 132.

In some embodiments, the remote service software 104 includes, or has access to a speech-to-text module. The remote service software 104, in such embodiments, feeds a live audio stream of audio as captured by the microphone 110 to the speech-to-text module and receives text in response thereto. The remote service software 104 then adds text in synchronization with the captured audio to the multimedia data stream that is sent to the SST 132. In some embodiments, the remote service software 104 may also feed an audio stream of a multimedia data stream received from the SST 132 to the speech-to-text module to receive text. That text is then either added to the received multimedia data stream which is then presented within a view of the live multimedia session presented by the remote service software or is presented directly in the view of the live multimedia session without adding it to the received multimedia data stream.

In some embodiments, the remote service software 104 also includes or has access to a text translation module to translate text from the speech-to-text module into a different language or regional form of a language, such as between British or Indian English forms to an American English form. In such embodiments, the text translation module may be invoked by the remote service software 104 based on a determination of whether the text from the speech-to-text module is to be translated. This determination may be made based on translation configuration data. Translation configuration data may include a configuration setting associated with one or both of the SST 132 and the remote service software 104. The translation configuration data may also, or alternatively, include input received from the SST 132 or within the remote service software 104. The text, once translated, may then be added to the added to the proper multimedia data stream or presented within a view of the live multimedia session as previously discussed.

In some embodiments, the remote service software 104 exchanges data, including the multimedia data stream, with a remote session module 136 of the SST 132 via the host 122. In such embodiments, transaction-related data may be exchanged via a transaction processing system 124 of the host 122 while live multimedia session data may be exchanged via a multimedia session management module 126. In some such embodiments, the multimedia session management module 126, once helping establish a live multimedia session between the remote service software 102 and the remote session module 136 of the SST 132, may provide data to facilitate transfer of the live multimedia session to a peer-to-peer connection. Such a peer-to-peer connection may be established between the remote service software 102 and the remote session module 136 of the SST 132 over the same or a different network. In such peer-to-peer embodiments, transaction related data, such as data representative of tendered currency and commands to dispense currency, may still be communicated via the transaction processing system 124 of the host 122.

In some embodiments, the multimedia session management module 126 may include or have access to the text-to-speech module. In such embodiments, the host 122 maintains the text-to-speech module rather than the remote service software 104 of the RST 102 or the remote session module 126 of the SST 132. Similarly, the host 122 may also maintain or have access to the translation module as discussed above.

The SST 132 includes SST software 134, the remote session module 136, a display 140 which may be a touch screen display, I/O devices, a microphone 142, and a camera 144. The SST software 134 is software that operates the SST to present output and receive input, such as to authenticate an SST 134 consumer and facilitate transaction therewith. The remote session module 136 adds interactive session capabilities to the SST software 134, such as may be in the form of a live multimedia session with the remote service software 104 on the RST 102. The remote session module 136 may be a part of the SST software 134, an add-on module to the SST software 134, or a distinct application that executes on the SST 132 in different embodiments.

In some embodiments, the remote session module 136 operates on the SST 132 in concert with the SST software 134 to facilitate live, interactive multimedia sessions, such as for banking, point of sale, and customer service purposes. The remote session module 136 operates to receive a live, multimedia session data stream from the remote service software 104 of the RST 102 and to form and provide a live, multimedia session data stream to the remote service software 104 of the RST 102 including audio data and video data captured by the microphone 142 and camera 144, respectively. The remote session module 136 also provides a view and plays audio of received multimedia session data. When presenting a view of video included in the multimedia session data, the remote session module may extract text from the multimedia session data and also present a view of the text in synchronization with the video and audio. However, in some embodiments, the audio may not be played, instead opting only to present the text.

In some embodiments, the remote session module 136 may include or have access to one or both of the speech-to-text and translation modules as discussed above. The speech-to-text module may be invoked to obtain a text transcript of audio in a received multimedia data stream when a text transcript is not included in the received multimedia data stream. The speech-to-text module may also be invoked to obtain text to add to a multimedia data stream generated on the SST 132. The translation module may be invoked to translate text received in or generated from a multimedia data stream prior to presentation or to translate text to be added to a multimedia data stream generated on the SST 132.

Figure 2:
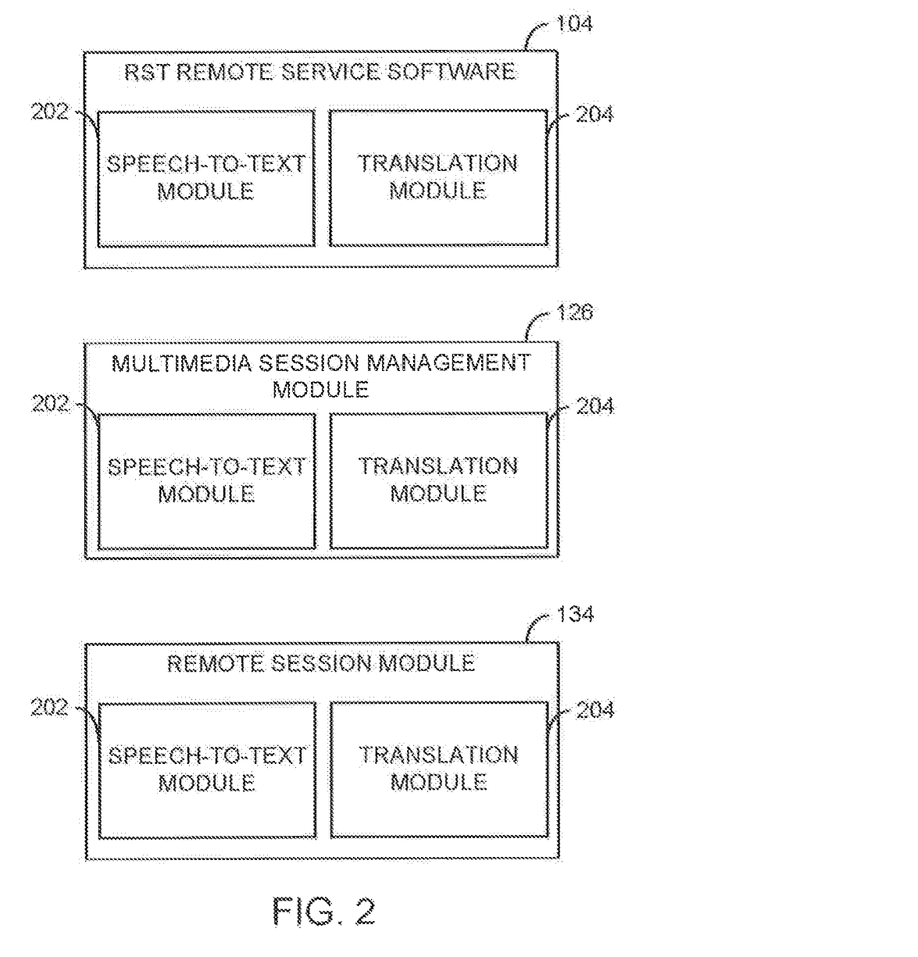
FIG. 2 is a logical block diagram of system modules, according to three example embodiments.

FIG. 2 is a logical block diagram of system modules, according to three example embodiments. The illustrated system modules include a speech-to-text module 202 and a translation module 204. As discussed above and with additional reference to FIG. 1, the speech-to-text module 202 and the translation module 204 may be present on or be accessible by one or more of the RST 102 remote service software 104, the multimedia session management module 126 on the host 122, and the remote session module 136 on the SST 132.

The speech-to-text module 202 may include abilities to generate text from speech in one or more different languages. The speech-to-text module 202 may auto detect a spoken language or receive input or have a configuration setting designating the spoken language. The translation module 204 may receive a command, utilize one or more configuration settings, or otherwise be aware of a language selection of a user to determine a language of received text and to determine a language into which to translate the text. As noted above, the translation may include a translation from one regional form of a language into another regional form.

Figure 3:
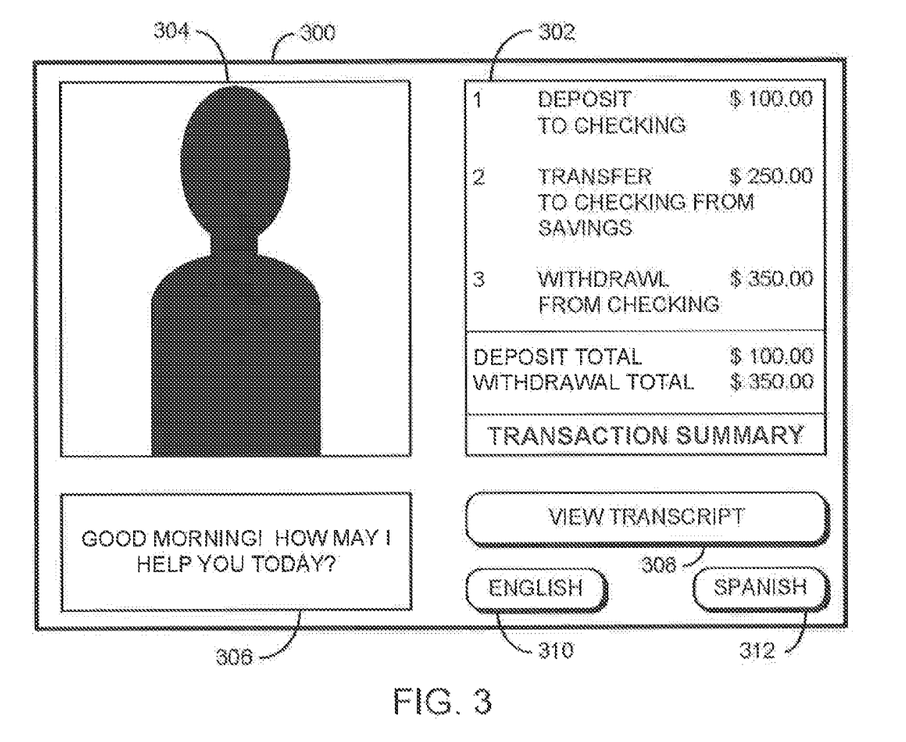
FIG. 3 is a user interface illustration, according to an example embodiment.

FIG. 3 is a user interface 300 illustration, according to an example embodiment. The user interface 300 is an example of a user interface that may be presented to an SST consumer, such as a user of the SST 132 of FIG. 1. As illustrated, the user interface 300 is that which may be presented when the SST is an interactive ATM. However, it will be readily apparent to one of skill in the art that the user interface 300 is adaptable to other implementations, such as point of sale terminals, customer service kiosks, and the like.

The user interface 300 includes a transaction summary 302 presentation, a video area 304, a text transcript area 306, and a set of control buttons. The set of control buttons includes a VIEW TRANSCRIPT button 308 to turn on a view of the text in the transcript area 306. The set of control buttons also includes ENGLISH button 310 and SPANISH button 312. The ENGLISH button 310 and SPANISH button 312 are selectable to specify a language in which to present transcript text within the transcript area 306 when activated with the VIEW TRANSCRIPT button 308. When a translation button is selected, software on the SST presenting the user interface 300 may perform the translation or send a command to a host or to an RST indicating the selected language. Similarly, when the VIEW TRANSCRIPT button 308 is selected, a command may also be sent to one or both of the host and an RST to turn the transcript generation on or off. However, in other embodiments, selection of the VIEW TRANSCRIPT button 308 does not send any commands and instead simply changes whether or not the transcript text is presented within the transcript area 306.

In another embodiment, the user interface 300 does not include a transcript area 306. Instead, transcript text, when enabled for presentation, is presented over a portion of the video area 304. Regardless of where transcript text is presented, the video area 304 is an area within the user interface that video of a multimedia data stream is presented.

The user interface 300 may also include other controls and areas to control other functions of the SST, the live multimedia session, or to present views of other data. Similarly, the user interface 300 may include fewer controls and areas in other embodiments.

FIG. 4 is a user interface 400 illustration, according to an example embodiment. The user interface 400 is an example of a user interface that may be presented on an RST, such as a user of the RST 102 of FIG. 1. As illustrated, the user interface 400 is that which may be presented when the RST conducts a live multimedia session with an interactive ATM. However, it will be readily apparent to one of skill in the art that the user interface 400 is adaptable to other implementations, such as for interaction with point of sale terminals, customer service kiosks, and the like.

The user interface 400 includes a video area 402, a text transcript area 404, a CONNECT button 412 to accept a live multimedia session from an SST, a HOLD button 414 to place the live multimedia session on hold as if it were a telephone call, and a set of transaction button 418 that may be selected to initiate particular transaction types. The user interface 400 also includes a transaction summary area 420 within which transaction related data of a live multimedia session is presented. The user interface 400 additionally includes a set of control buttons. The set of control buttons includes a VIEW TRANSCRIPT button 306 to turn on a view of the text in the transcript area 404. The set of control buttons also includes ENGLISH button 408 and SPANISH button 410. The ENGLISH button 408 and SPANISH button 410 are selectable to specify a language in which to present transcript text within the transcript area 404 when activated with the VIEW TRANSCRIPT button 406. When a translation button is selected, software on the RST presenting the user interface 400 may perform the translation or send a command to a host or to the SST indicating the selected language. Similarly, when the VIEW TRANSCRIPT button 406, a command may also be sent to one or both of the host and an SST to turn the transcription generation on or off. However, in other embodiments, selection of the VIEW TRANSCRIPT button 406 does not send any commands and instead simply changes whether or not the transcript text is presented within the transcript area 404.

The user interface 400 also includes an area 422 within which transaction related documents may be viewed. For example, an SST user may be making a deposit of a check. A check may be inserted into the SST and the SST may scan a front and back of the check. Images of the check front and back scans may then be presented in the area 422 allowing the RST user to confirm check details.

The user interface 400 may also include other controls and areas to control other functions of the RST and software present thereon, the live multimedia session, or to present views of other data. Similarly, the user interface 400 may include fewer controls and areas in other embodiments.

For example, the user interface 400 may include a predefined selection area 428 that includes a plurality of selectable controls 430 through 452. Selection area 428 enables a user who is mute and who has difficulty entering text via a keyboard to communicate easily and quickly via the live chat text area 404. The shortcut text controls may request a transaction type or may include general conversational text, such as "I would like to" so that the customer can select that text the supplement it with manually entered text.

Three of these selectable controls 430 through 434 are function controls that allow the customer to perform predefined functions (namely, to present a numeric keypad, to present a text keyboard, and to delete text from the live chat session). In addition, nine of the selectable controls 436 through 452 are predefined shortcut text controls.

When a customer selects the withdraw cash selectable control 436 then the user interface 400 communicates a statement to a remote agent (such as a human operator) at the RST via the live chat area 404 indicating that the customer would like to withdraw cash. The full statement that is communicated to the RST may comprise a sentence such as "I would like to withdraw cash".

When a customer selects the deposit cash selectable control 438 then the user interface 400 communicates a statement to a remote agent (such as a human operator) at the RST via the live chat area 404 indicating that the customer would like to deposit cash. The full statement that is communicated to the RST may comprise a sentence such as "I would like to deposit cash".

When a customer selects the pay a bill selectable control 440 then the user interface 400 communicates a statement to a remote agent (such as a human operator) at the RST via the live chat area 404 indicating that the customer would like to pay a bill. The full statement that is communicated to the RST may comprise a sentence such as "I would like to pay a bill".

When a customer selects the deposit a check selectable control 442 then the user interface 400 communicates a statement to a remote agent (such as a human operator) at the RST via the live chat area 404 indicating that the customer would like to deposit a check. The full statement that is communicated to the RST may comprise a sentence such as "I would like to deposit a check".

When a customer selects the cash a check selectable control 444 then the user interface 400 communicates a statement to a remote agent (such as a human operator) at the RST via the live chat area 404 indicating that the customer would like to cash a check. The full statement that is communicated to the RST may comprise a sentence such as "I would like to cash a check".

When a customer selects the transfer selectable control 446 then the user interface 400 communicates a statement to a remote agent (such as a human operator) at the RST via the live chat area 404 indicating that the customer would like to transfer money to an account. The full statement that is communicated to the RST may comprise a sentence such as "I would like to transfer money to an account".

When a customer selects the new account selectable control 448 then the user interface 400 communicates a statement to a remote agent (such as a human operator) at the RST via the live chat area 404 indicating that the customer would like to open a new account. The full statement that is communicated to the RST may comprise a sentence such as "I would like to open a new account".

When a customer selects the statement selectable control 450 then the user interface 400 communicates a statement to a remote agent (such as a human operator) at the RST via the live chat area 404 indicating that the customer would like to obtain a statement. The full statement that is communicated to the RST may comprise a sentence such as "I would like to obtain a statement".

When a customer selects the loan application selectable control 450 then the user interface 400 communicates a statement to a remote agent (such as a human operator) at the RST via the live chat area 404 indicating that the customer would like to complete a loan application. The full statement that is communicated to the RST may comprise a sentence such as "I would like to complete a loan application".

Figure 5:
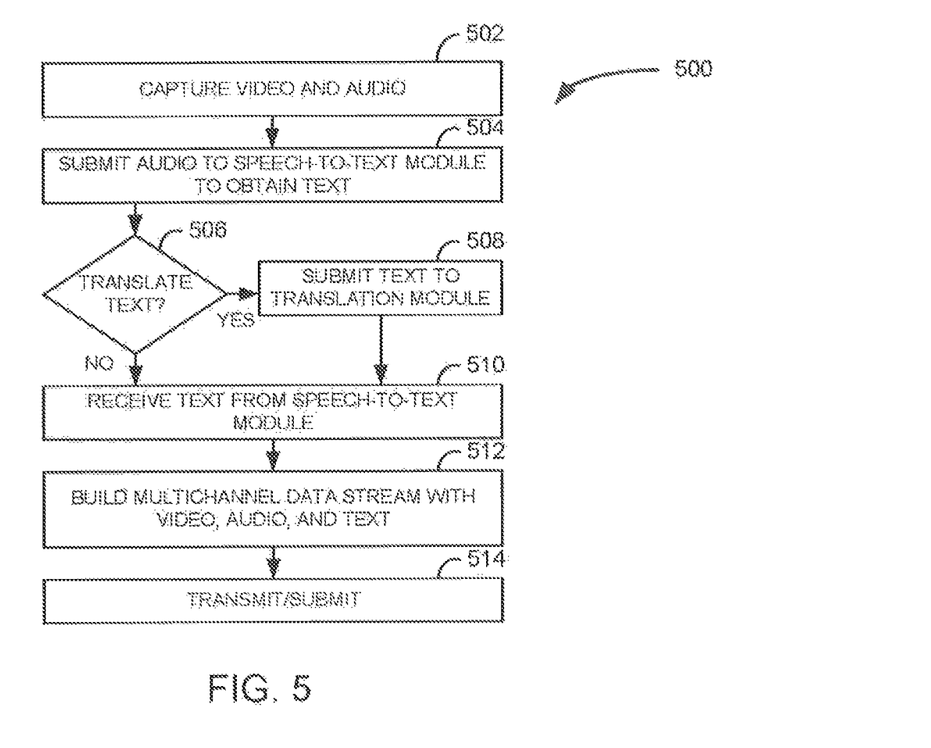
FIG. 5 is a block flow diagram of a method, according to an example embodiment.

FIG. 5 is a block flow diagram of a method 500, according to an example embodiment. The method 500 is an example of data processing operations performed on an RST according to some embodiments. The method 500 is typically performed in real-time against a stream of audio and video data as captured by a camera and a microphone by an RST.

The method 500 includes capturing 502 video and audio on the RST within a live multimedia session with a SST, such as the RST 102 and SST 132 of FIG. 1. The method 500 may then submit 504 audio to a speech-to-text module to obtain text and determine 506 whether the text is to be translated into another language. When the text is to be translated, the text is submitted 508 to a translation module. The text is then received 510 from the speech-to-text module, including any translation that may have been performed. The method 500 then builds 512 a multichannel data stream with the video, audio, and text. However, in other embodiments, the multichannel data stream may already exist. In such embodiments, the text is added to a text channel of the multichannel data stream. The multichannel data stream is then transmitted or submitted 514, depending on the embodiment. For example, the multichannel data stream may be transmitted to a host or to the SST in some embodiments. However, in other embodiments, a process of remote service software on the RST may handle the transmission function. As such, the multichannel data stream may instead be submitted to the remote service software.

Figure 6:
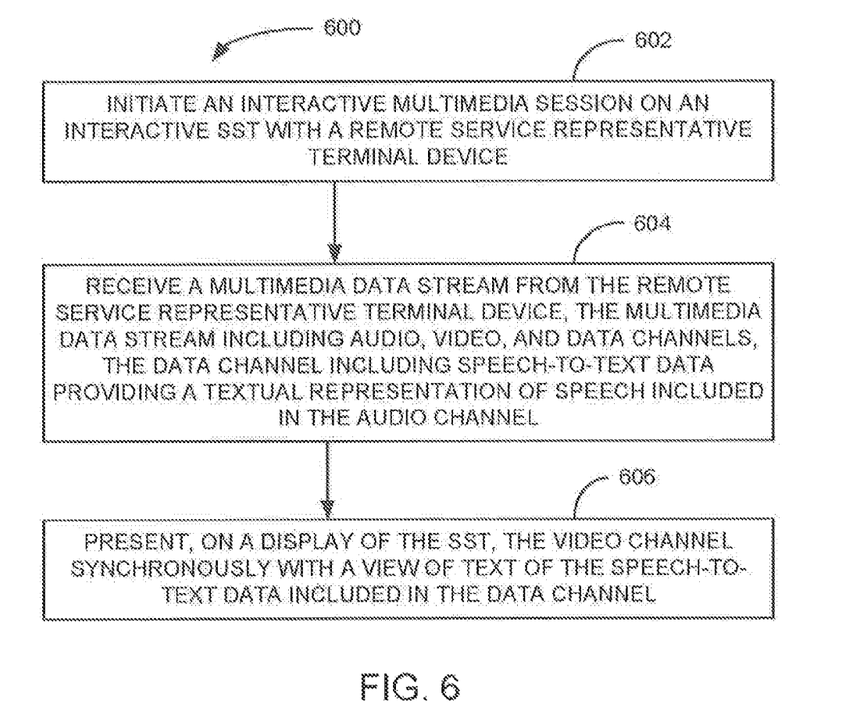
FIG. 6 is a block flow diagram of a method, according to an example embodiment.

FIG. 6 is a block flow diagram of a method 600, according to an example embodiment. The method 600 is an example of data processing operations performed on an SST according to some embodiments. The method 600 is typically performed in real-time against a stream of audio and video data as received from an RST, as may be relayed by a host.

The method 600 includes initiating 602 an interactive multimedia session on an interactive SST with a RST device. Initiating 602 an interactive multimedia session may include requesting a connection with a service representative by selecting a connect button that may be presented on a touch screen display device on the SST. In such embodiments, upon receipt of a selection of the connect button, the method 600 may generate and transmit, via a network, an interactive multimedia session request to a host. The host may relay the connection request to an RST. In response thereto, interactive multimedia session connectivity data is received from the host. A connection is then established according to the received connectivity data.

After a connection is established between the SST and the RST, which may include a connection made via a host, the method 600 includes receiving 604 a multimedia data stream from the RST device. The multimedia data stream typically includes audio, video, and data channels. The data channel may include speech-to-text data providing a textual representation of speech included in the audio channel. The method 600 further includes presenting 606, on a display of the SST such as the touch screen display device, the video channel synchronously with a view of text of the speech-to-text data included in the data channel. The presenting 606 may further include playing audio from the audio channel through a speaker of the SST, via a telephone-like handset, or via a headphone jack of the SST. However, the SST may include a selectable option to disable the presenting of the text of the speech-to-text data included in the data channel.

Some embodiments of the method 600 also include presenting, on the display of the SST, at least two language options for presentation of the text of the speech-to-text data included in the data channel. Upon receipt of language option input with regard to one of the at least two language options, the method 600 in such embodiments includes triggering a translation operation such that the presenting of the text is performed in a language according to the received language option input. Triggering of the translation operation may cause the translation to be performed locally on the SST or transmission of a command to the host or to the RST depending upon where a translation module is deployed or is accessible in the particular embodiment. In some such embodiments, the at least two language options include at least two nationalizing options with regard to the same language, such a British, American, Canadian, or Australian forms of English.

Figure 7:
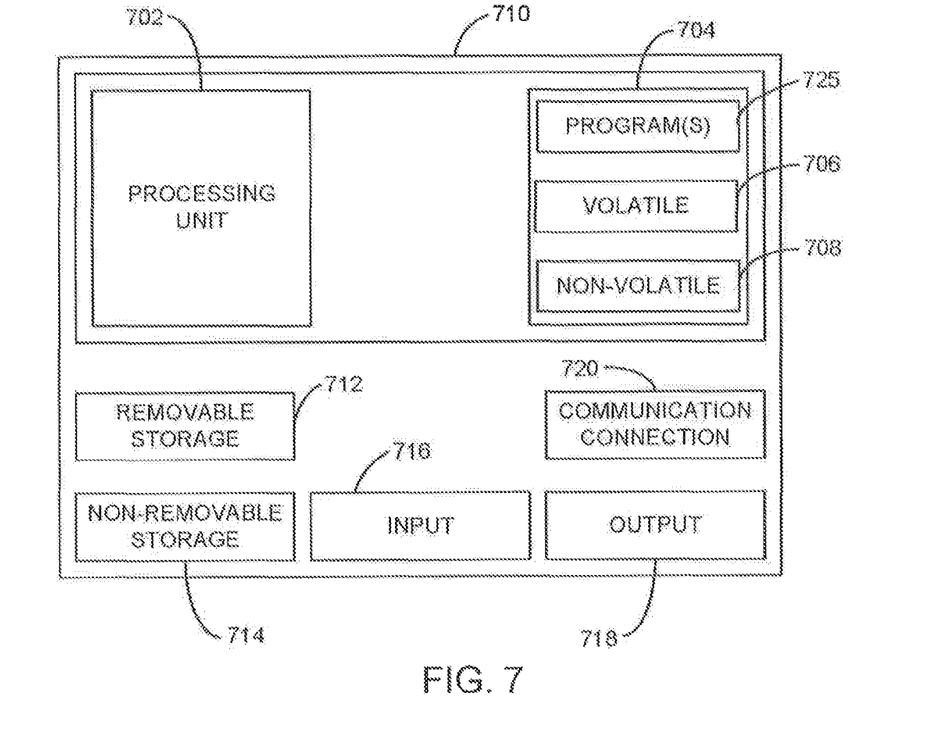
FIG. 7 is a block diagram of a computing device, according to an example embodiment.

FIG. 7 is a block diagram of a computing device, according to an example embodiment. In one embodiment, such a computing device is present within a SST to enable user interaction and host interaction. In another embodiment, such a computing device may be implemented as a remote service representative terminal device as may be utilized by a remote service representative, such as a remote banking teller. An object-oriented, service-oriented, or other architecture may be used to implement various functions and to communicate between multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 710 may include or have access to a computing environment that includes input 716, output 718, and a communication connection 720. The input 716 may include one or more of a keyboard, a personal identification number (PIN) pad, a touch screen, a video camera, a microphone, a biometric reading device, and the like. The output may include one or more of a receipt printer, a video monitor, one or more speakers, one or more headphone jacks to which another audio output device maybe coupled, a handset including both a speaker and a microphone, a currency dispenser, tactile output, and other output devices depending on the particular embodiment.

The computer operates in a networked environment using a communication connection to connect to one or more remote computers, such as host computer. The communication connection may include a Local Area Network (LAN), a Wide Area Network (WAN), a private, dedicated network, or other networks that provide sufficient security that may be needed or required by statute, regulation, other law, or policy. In some embodiments, the network is a network dedicated to connecting SSTs to one or more hosts. In some embodiments, a remote service representative terminal device may also connect to such a dedicated network.

Computer-readable instructions stored on a computer-readable medium are executable by the processing unit 702 of the computer 710. A hard drive, CD-ROM, and RAM are some examples of articles including a non-transitory computer-readable medium. For example, a computer program 725 capable of providing SST functionality, remote service representative terminal device functionality, or to perform at least a portion of one or more of the methods and processes described herein may be included on a CD-ROM or a portable hard drive and loaded therefrom to a local hard drive.

An additional embodiment may be in the form of a method that may be performed on one or more of an SST, a host, and an RST. This method includes performing speech-to-text processing of an audio portion of a multimedia data stream of a live multimedia session between an SST and a service representative terminal device to obtain text. The method then augments the multimedia data stream with the text. In some such embodiments, augmenting the multimedia data stream with text includes adding the text to the multimedia data stream in a manner such that when the multimedia data stream is presented by a recipient computing device, the text is presented synchronously with a rendering of a video portion of the multimedia data stream presentation.

In a further of such embodiments, the method includes performing a language translation on the text from the speech-to-text processing to obtain translated text. The augmenting of the multimedia data stream with the text in such embodiments includes augmenting the data stream with the translated text.

In one or more of these additional method embodiments, the multimedia data stream includes two multimedia data streams. A first of the two multimedia data streams is received over a network by a host from the SST and a second of the two multimedia data streams is received over the network by the host from the RST device. In such embodiments, the method is performed by the host on at least one of the first and second multimedia data streams.

A further embodiment is in the form of a system. The system of such embodiments includes at least one processor, at least one memory device, a video camera, a microphone, and at least one network interface device. The system also includes a speech-to-text module, stored in the at least one memory device and executable by the at least one processor, to receive an audio input and provide a text output. An RST application is also stored in the at least one memory device and executable by the at least one processor.

The RST application in such embodiments is executable to establish, via the at least one network interface device, a live multimedia session with an interactive SST and to present a view of a video channel and output audio of an audio channel, the video and audio channels being channels of a first multichannel multimedia stream received from the SST. The RST application is further executable to capture video from the video camera synchronously with audio from the microphone into a second multichannel multimedia stream and to feed audio captured from the microphone to the speech-to-text module to obtain the text output. The RST application then adds the text output to a data channel of the second multichannel multimedia stream and transmits, via the at least one network interface device, the second multichannel multimedia stream to the SST.

In some embodiments, the RST application is further executable by the at least one processor to receive financial transaction input with regard to a financial transaction on the SST and to generate at least one SST command based on the received financial transaction input. The RST application may then transmit, via the at least one network interface device, data representative of the at least one SST command to the SST. The transmitting of the data representative of the at least one SST command to the SST may include adding data representative of the at least one SST command to the data channel of the second multichannel multimedia stream that is transmitted to the SST.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
performing speech-to-text processing of an audio portion of a multimedia data stream of a live multimedia session for presentation on a Self Service Terminal (SST) to obtain text;
augmenting the multimedia data stream with the text, wherein augmenting the multimedia data stream with text includes adding the text to the multimedia data stream in a manner such that when the multimedia data stream is presented by the SST, the text is presented synchronously on the SST with a rendering of a video portion of the multimedia data stream presentation; and
simultaneously presenting with the multimedia data stream transaction documents associated with a transaction being performed by a user operating the SST.

2. The method of claim 1, further comprising:
performing a language translation on the text from the speech-to-text processing to obtain translated text; and
wherein the augmenting of the multimedia data stream with the text includes augmenting the data stream with the translated text.

3. The method of claim 1, wherein the language translation is performed according to:
at least one configuration setting associated with the SST; or
input received by the SST.

4. The method of claim 1, wherein the method is performed on the SST.

5. The method of claim 1, wherein:
the multimedia data stream includes two multimedia data streams, a first multimedia data stream generated on the SST for transmission over a network, a second multimedia data stream received over the network by the SST.

6. The method of claim 1, further comprising:
transmitting the second multimedia data stream over the network.

7. The method of claim 1, wherein the multimedia data stream includes audio, video, and data portions, wherein the augmenting of the multimedia data stream includes adding the text to the data portion.

8. A method comprising:
initiating an interactive multimedia session on an interactive Self Service Terminal (SST) with a remote service representative terminal device;
receiving a multimedia data stream on the SST, the multimedia data stream including audio, video, and data channels, the data channel including speech-to-text data providing a textual representation of speech included in the audio channel;
presenting, on a display of the SST, the video channel synchronously with a view of text of the speech-to-text data included in the data channel, wherein presenting further includes adding the text to the multimedia data stream in a manner such that when the multimedia data stream is presented by the SST, the text is presented synchronously on the SST with a rendering of a video portion of the multimedia data stream; and
simultaneously presenting on the display of the SST transaction documents associated with a transaction being performed by a user operating the SST.

9. The method of claim 8, further comprising:
receiving input into the SST to disable the presenting of the text of the speech-to-text data included in the data channel.

10. The method of claim 8, further comprising:
presenting, on the display of the SST, at least two language options for presentation of the text of the speech-to-text data included in the data channel; and
upon receipt of language option input with regard to one of the at least two language options, triggering a translation operation such that the presenting of the text is performed in a language according to the received language option input.

11. The method of claim 10, wherein the at least two language options include at least two nationalizing options with regard to the same language.

12. The method of claim 10, wherein trigging the translation operation includes transmitting data representative of the received language option input to a host.

13. The method of claim 8, wherein initiating the interactive multimedia session includes:
receiving initiation input on the SST requesting the interactive multimedia session;
generating and transmitting, via a network, an interactive multimedia session request to a host;
receiving, via the network, interactive multimedia session connectivity data from the host; and
connecting to the interactive multimedia session according to the received connectivity data.

14. A Self-Service Terminal (SST) comprising: a display viewable by a customer at the SST; and
a controller coupled to the display and operable to:
present, on the display, text provided by a remote agent;
present, on the display, transaction documents associated with a transaction being performed by a user operating the SST: present on the display, live video included in a received live multimedia data stream;
convert speech included in the audio of the live multimedia data stream to a text representative of the speech as text, and add the text to the live multimedia data stream in a manner such that when the live multimedia data stream is presented by the SST, the text is presented synchronously on the SST with a rendering of a video portion of the live multimedia data stream; and
provide to the customer at the SST a plurality of selectable controls, each selectable control being operable to convey a transaction request to the remote agent.

15. The SST of claim 14, wherein the transaction request may be sent as text via a live chat interface so that the remote agent reads the transaction request as if it was typed by the customer.

16. The SST of claim 14, wherein the another textual form is a textual form of another language.

17. The SST of claim 14, wherein the controller is further operable, prior to presenting the view of the text representative of the speech included in the audio of the received live multimedia data stream, to:
translate the text representative to another textual form.

18. The SST of claim 14, wherein the controller is further operable to:
capture video from a video camera synchronously with audio from a microphone into a second live multimedia data stream;
transmit, via a network interface device of the SST, the second live multichannel multimedia stream to a source of the received live multimedia data stream.

19. The SST of claim 14, wherein the received multimedia data stream includes an SST command instructing the controller with regard to SST operation.

20. An SST comprising:
a memory and one or more processors; and
user interface software residing as instructions in memory and executing on the one or more processors and configured with a received text field operable to display text received from a remote agent, a submit text field operable to receive inputs from a customer at the user interface and transmit them to a remote agent, and a plurality of controls, each control being operable to convey different predefined text to the remote agent when selected by the customer, and the user interface configured to present transaction documents relevant to a transaction being conducted by the customer, and wherein user interface further configured to add text to a multimedia data stream in a manner such that when the multimedia data stream is presented by the SST, the added text is presented synchronously on the SST with a rendering of a video portion of the multimedia data stream.

* * * * *